March 7, 1967

J. MAURICE 3,307,667

DECLUTCHING DEVICE FOR OBVIATING WEAR ADJUSTMENT

Filed July 24, 1964

INVENTOR
JEAN MAURICE
By Irwin S. Thompson
ATTY.

March 7, 1967 J. MAURICE 3,307,667
DECLUTCHING DEVICE FOR OBVIATING WEAR ADJUSTMENT
Filed July 24, 1964 9 Sheets-Sheet 2

INVENTOR
JEAN MAURICE

March 7, 1967  J. MAURICE  3,307,667
DECLUTCHING DEVICE FOR OBVIATING WEAR ADJUSTMENT
Filed July 24, 1964  9 Sheets-Sheet 5

INVENTOR
JEAN MAURICE
By Irwin S. Thompson
ATTY.

March 7, 1967 J. MAURICE 3,307,667
DECLUTCHING DEVICE FOR OBVIATING WEAR ADJUSTMENT
Filed July 24, 1964 9 Sheets-Sheet 6

INVENTOR
JEAN MAURICE
BY Irwin S. Thompson
ATTORNEY

March 7, 1967  J. MAURICE  3,307,667
DECLUTCHING DEVICE FOR OBVIATING WEAR ADJUSTMENT
Filed July 24, 1964  9 Sheets-Sheet 7

INVENTOR
JEAN MAURICE
By Irwin S. Thompson
ATTY.

United States Patent Office 3,307,667
Patented Mar. 7, 1967

3,307,667
DECLUTCHING DEVICE FOR OBVIATING
WEAR ADJUSTMENT
Jean Maurice, Paris, France, assignor to Societe Anonyme Francaise du Ferodo, a corporation of France
Filed July 24, 1964, Ser. No. 384,866
Claims priority, application France, July 30, 1963, 943,131; July 10, 1964, 981,380
18 Claims. (Cl. 192—91)

In general, in clutches, the actual operation of declutching is preceded by an approach, the amplitude of which (known as the clearance) is variable with the degree of wear. This makes it necessary to proceed to adjustments so as to restore the clearance, and these adjustments must be carried out from time to time as and when the parts of the clutch, in particular the friction disc, become worn. In order to avoid such adjustments, it has already been proposed to eliminate the clearance or to maintain the clearance constant, irrespective of the wear, but palliatives of this kind result in unreliable operation or necessitate the use of complicated and expensive mechanisms.

The present invention has for its object to provide a device for de-clutching which obviates any adjustment of clearance and without introducing the disadvantages indicated above.

In accordance with the invention, the clearance is essentially left variable with wear but is provided sufficiently large when the clutch is new so that it does not become zero after total wear. According to the invention furthermore, the movement of actuation proper is initiated from a constant pre-determined position on the travel of the pedal and a lost motion is interposed between the movements of approach and actuation. It will be noted that the amplitudes of the approach movement and the lost motion vary inversely as a function of the wear and maintain a constant sum.

The present invention has also for its object a device for carrying the above advantages into effect, comprising a de-clutching pedal, coupling means between the said pedal and a de-clutching stop, and a de-clutching ring associated with the de-clutching mechanism of the clutch, and separated at rest from the said stop by a clearance which varies with wear, the said device being especially characterized in that the coupling means between the pedal and the de-clutching stop comprise an effort-limiting means calibrated to a value higher then the effort for the approach of the stop into contact with the ring, and less than the effort required to move the ring, and means for putting the said effort-limiting means out of action from a pre-determined position on the travel of the pedal.

The objects, characteristic features and advantages of the invention will be further brought out in the description which follows below of forms of construction chosen by way of example, reference being made to the accompanying drawings, in which.

Figure 1:
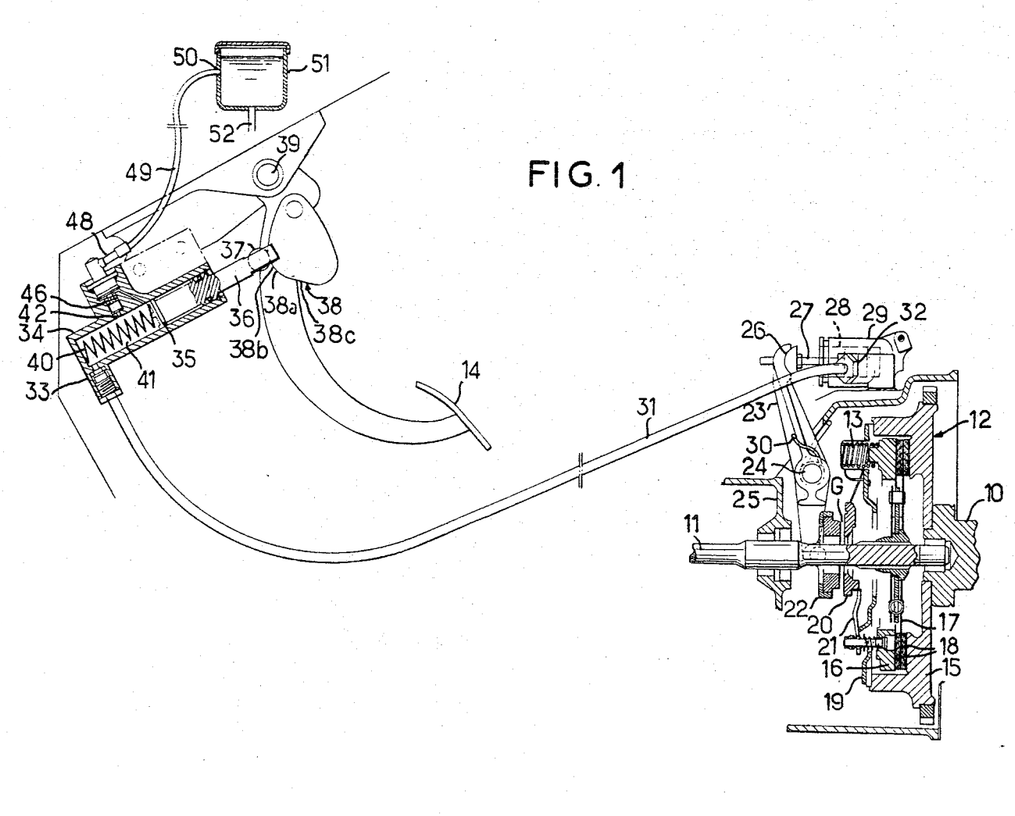
FIG. 1 is a general diagrammatic view of a de-clutching control according to the invention.

Reference will first be made to FIG. 1, in which there is shown at 10 the driving shaft and at 11 the driven shaft of a clutch 12 of an automobile vehicle, which is normally held engaged by clutch springs 13, but which the driver can de-clutch at will by acting on the pedal 14. In the example shown, the clutch 12 comprises: a fly-wheel 15 which forms a supporting plate and which is fixed to the driving shaft 10; a clamping-plate 16 which is freely mounted axially with respect to the plate 15 while being fast for rotation with this latter; and a friction disc 17 of which the friction linings are shown at 18, which is intended to be gripped between the plates 15 and 16 and which is coupled to the driven shaft 11.

A cover 19 is rigidly fixed to the fly-wheel plate 15 and serves as a support for the clutch springs 13 which act on the plate 16 for gripping the disc 17 between the plates 15 and 16. A ring 20 is mounted freely axially with respect to the cover 19, while being fast for rotation with this latter, and actuates de-clutching levers 21 which, while being supported on the cover 19, are intended to move apart the plate 16 and the disc 17 against the action of the springs 13.

The ring 20 is intended to be engaged by a de-clutching stop 22 which is axially movable and fixed for rotation. The stop 22 is mounted on a fork 23 which is pivoted at 24 on the fixed casing 25 of the clutch. The fork 23 abuts at 26 against the rod 27 of the piston 28 of a hydraulic receiver jack 29, and this abutment relation is maintained by a spring 30 acting against the casing 25 and the fork 23.

The piston 28 is actuated by the hydraulic pressure in a conduit 31 which is coupled at 32 to the receiver 29 and which issues at 33 from a transmitter master-cylinder 34, operated by the pedal 14.

When the pedal 14 is left free, no pressure is applied to the conduit 31 and the spring 30 acts through the intermediary of the fork 23 in abutment at 26 on the rod 27, to maintain the piston 28 completely driven into the receiver 29. The fork 23 occupies a position of rest in which the stop 22 is separated from the ring 20 by a space, known as the clearance, shown at G in FIG. 1. The clutch is held engaged by the springs 13. When pressure is applied on the pedal 14, the conduit 31 is put under pressure, and the piston 28, which is moved towards the left of FIG. 1, causes the fork 23 to swing over, which results in a first stage in the stop 22 coming into contact with the ring 20, and in an ulterior stage, the movement as a unit towards the right of FIG. 1 of the stop 22 and the ring 20 to effect the de-clutching operation.

As will be well understood, the clearance G varies during the course of the life of the clutch by reason of the wear of the friction linings 18 and the wear of the stop 22. In general, this clearance G tends to be reduced in proportion to the wear, since the linings 18 wear more rapidly than the stop 22.

According to the invention, means are provided to ensure perfect operation of the clutch during the whole life of this latter, without having need to proceed to adjustments for restoring the clearance, and without the driver being able to observe the smallest change in the manner in which the clutch behaves during de-clutching.

Figure 2:
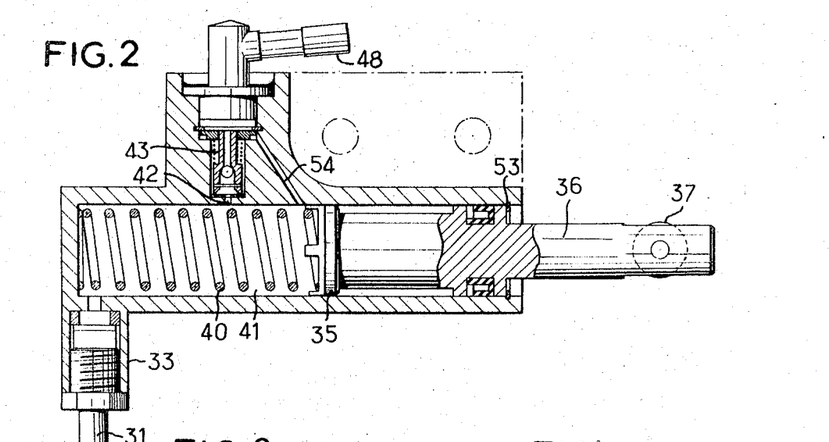
FIG. 2 is a view to a larger scale of a master-cylinder of this control, in the position of rest.

The transmitter 34 comprises a piston 35, the rod 36 of which is provided with a roller 37 which cooperates with a cam 38 rigidly fixed to the pedal 14. There is shown at 39 the pivotal shaft of this pedal on the frame.

The piston 35 is restored to the position of rest by a spring 40 and defines a chamber 41 in the transmitter 34, having the coupling 33 at its extremity and having furthermore at a pre-determined position of its lateral wall, a small by-pass and filling orifice 42.

Figure 4:
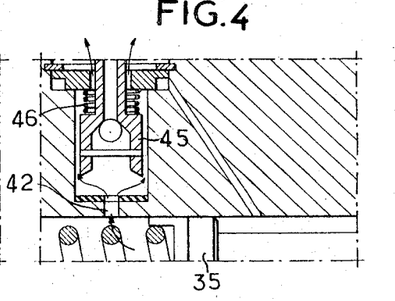
Figure 5:
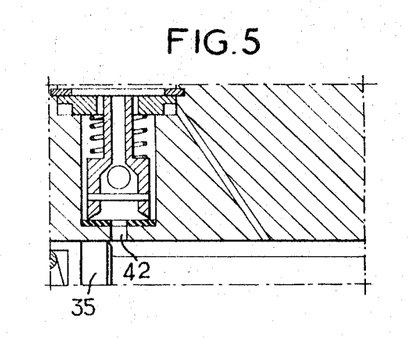

During the course of the downward movement of the pedal 14, the piston 35 first leaves open the orifice 42 (FIGS. 3 and 4), which thus communicates with the chamber 41, after which it passes over this orifice 42 and from then on isolates it from the said chamber (see FIG. 5). A transition of operation of this kind is precisely positioned in the travel of the pedal 14 and the piston 35, since the position of the orifice 42 is fixed. The cam 38 gives a variable step-down gearing effect which is greater at the end than at the beginning of the downward travel of the pedal, and is provided for that purpose with two successive ramps 38b and 38c separated from each other by a transition point 38a chosen in such manner that the roller 37 is located on it when the piston 35 begins to close the orifice 42.

As explained hereinbelow, the cam 38 has two successive ramps 38b and 38c separated from each other by the transition point 38a chosen in such manner that the roller 37 is located on it when the piston 35 begins to close the orifice 42.

The orifice 42 (FIGS. 2 and 3) communicates with a small chamber 43 provided with a seating 44 for an annular valve 45 returned to the closed position by a spring 46. Inside the valve 45 is mounted a ball 47 providing a flow in one direction only. The chamber 43 is connected by a coupling 48 (FIG. 1) to a conduit 49 which is connected in turn at 50 to a tank 51. This tank may be the reservoir of the hydraulic brakes of the vehicle. The coupling 50 is preferably arranged above the coupling 52 for the brakes.

When the orifice 42 is uncovered by the piston 35 and the chamber 41 draws oil from the tank 51, the oil pushes the ball 47 downwards and can pass from the tank 51 to the chamber 41. When the orifice 42 is uncovered by the piston 35 and the chamber 41 is under pressure, if this pressure is less than the value which corresponds to the calibration of the spring 46, the valve 45 is held closed by this spring and the oil cannot pass out of the chamber 41 through the orifice 42 since the valves 45 and 47 are closed. If this pressure is greater than the value which corresponds to the calibration of the spring 46, the valve 45 lifts and the oil can then pass from the chamber 41 to the tank 51 through the orifice 42, the chamber 43 and the conduit 49.

The calibration of the spring 46 is chosen to be greater than the value which corresponds to the effort necessary to bring the stop 22 into contact with the ring 20, and less than the value which corresponds to the effort necessary to move the ring 20 against the action of the springs 13.

In ths position of rest (FIGS. 1 and 2), the piston 35 is pushed back into abutment at 53 (FIG. 2) by the spring 40 and the chamber 41 communicates directly with the coupling 48 of the conduit 49 of the tank 51 through an oblique passage 54. No pressure is applied to the conduit 31. The stop 22 is kept separated from the ring 20 by the distance or clearance G.

In the new condition of the various parts of the clutch, this clearance G is chosen to be sufficiently great so that it is not reduced to zero after the parts are completely worn. For example, in order to give a definite idea, the clearance G may be 8 mm. when the parts are new and may fall to 2 mm. after they are totally worn.

Figure 3:
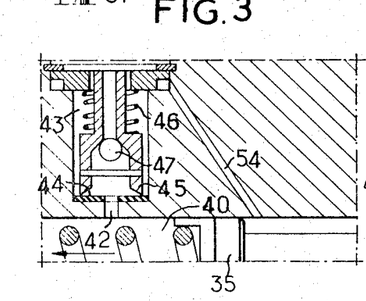
FIGS. 3, 4 and 5 are views, again to a larger scale, of a part of this master-cylinder in various positions of operation.

When the pedal 14 is depressed, the cam 38 pushes back the piston 35 with a small step-down ratio, and the piston passes almost immediately over the passage 54 (FIG. 3). The oil from the chamber 41 expelled by the piston 35 meets less resistance in moving the piston 28 in order to bring the stop 22 into contact with the ring against the action of the spring 30 than in lifting the valve 35 against the action of the spring 46. The stop 22 is thus brought into contact with the ring 20.

The piston 35 then occupies a position which depends on the state of wear but which in any case is such that it is short of the orifice 42.

From that moment, the oil from the chamber 41 continuing to be expelled by the piston 35, meets less resistance in lifting the valve 45 against the action of the spring 46 (FIG. 4) than in moving the piston 28 in order to displace the whole of the stop 22 and the ring 20 against the action of the springs 30 and 13.

The oil expelled by the piston 35 thus returns to the tank 51 through the orifice 42 and the unit 22–20 remains stationary, in the waiting position.

As explained hereinbelow, the cam 38 has two successive ramps 38b and 38c separated from each other by the transition point 38a chosen in such manner that the roller 37 is located on it when the piston 35 begins to close the orifice 42.

When the piston 35 covers the orifice 42, this by-pass is put out of action and the oil continuing to be expelled by the piston 35 moves the piston 28 and the assembly 22–20 against the action of the springs 30 and 13 thus effecting the de-clutching. This movement is carried out with a step-down ratio of higher value, since the sloping face of the cam 38 has changed at 38a at the moment when the orifice 42 was closed by the piston 35. The operation is thus facilitated.

In an alternative form of construction (FIG. 6), the valve 45 is eliminated and the orifice 42 communicates with a chamber 60, of which one moving wall 61 forming a piston, is provided with an elastic means consisting of a calibrated spring 62.

Figure 7:
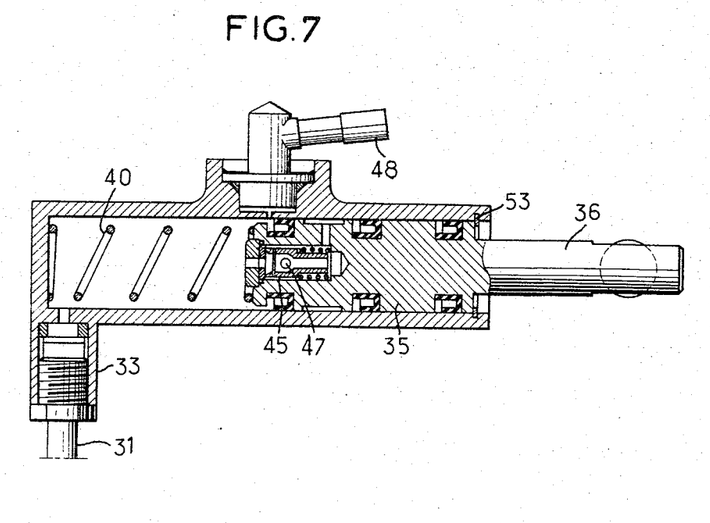
FIGS. 7, 8, 9, 10 and 11 are views similar to FIG. 2, but relating respectively to five alternative forms of master-cylinder.

It should be observed that the device with a valve 45 or a piston 61 could be incorporated in the piston 35. There is shown for example in FIG. 7 a construction of the piston 35 which incorporates the valves 45 and 47.

Figure 6:
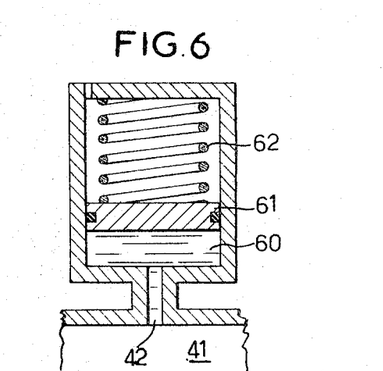
FIG. 6 relates to a modified detail of the master-cylinder.

In a further alternative form (FIG. 8) the change in step-down ratio is obtained, not by a cam such as the cam 38, but by a change in the working section of the piston 35. To this end, the chamber 41 which comprises the coupling 33 of the conduit 31 receives a piston element 35a. This latter is rigidly fixed to a piston element 35b mounted in a chamber 41' of greater diameter than the chamber 41. Orifices 65 having pre-determined positions provide communication between the chambers 41 and 41'. The chamber 41' is provided with an orifice 42' having, in the form shown, a valve of similar construction to the valve 45 of FIG. 3, or alternatively a chamber 60 with a piston 61, such as shown in FIG. 6.

Figure 8:
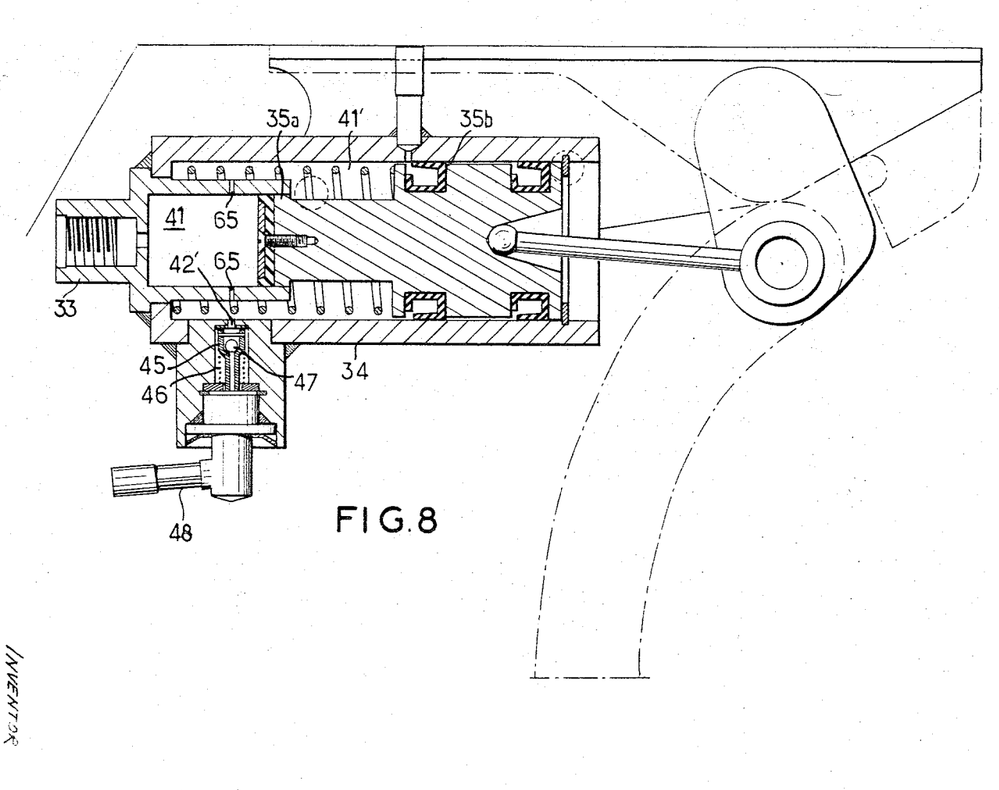

The operation is similar to that which has been described with reference to FIGS. 1 to 5. As long as the piston 35a has not passed over the orifices 65, the oil is forced from the chambers 41 and 41', depending on the total section of the pistons 35a and 35b. As long as the stop 22 has not reached the ring 20, the valve 45 remains closed and then, after contact of the stop 22 with the ring 20, the valve 45 opens. When the piston 35a has passed over the orifices 65, the oil is expelled from the chamber 41 under the section of the piston 35a alone, that is to say with a greater step-down ratio, and ensures the movement as a unit of the assembly 22–20 for de-clutching.

Figure 9:
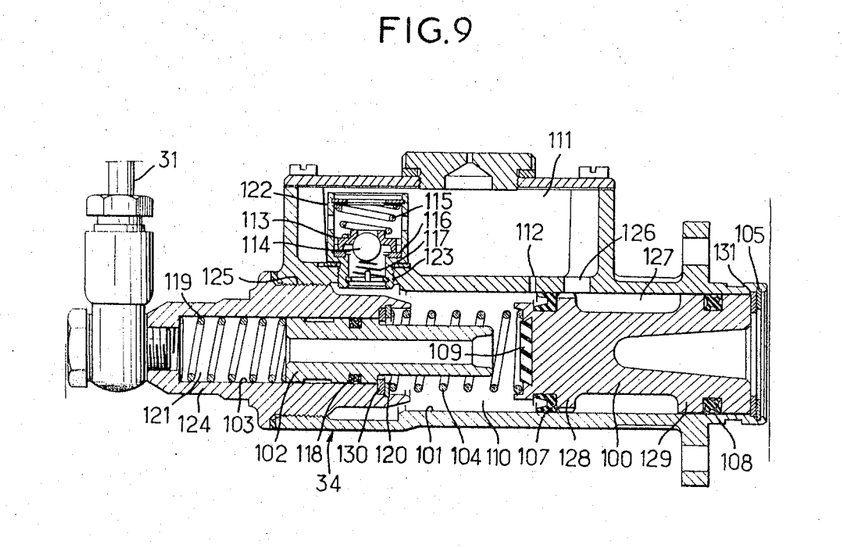

In the alternative form shown in FIG. 9, the emitter 34 comprises two pistons in line, one of large diameter 100 slidably mounted in a bore 101, the other of smaller diameter 102 slidably mounted in a bore 103. The bore 101 is directly formed in the cylinder 34, while the bore 103 is formed in one piece 124 screwing at 125 into the cylinder 34.

The piston 100 is returned by a spring 104 to the position of rest, applied against a stop 105. The piston 100 is actuated by a pedal 14 through the intermediary of a rod in a manner similar to that shown in FIG. 1.

The piston 100 comprises two lateral sealing joints 107 and 108, co-operating with the bore 101, together with a front buffer 109 of flexible or elastic material, intended to co-operate in fluid-tight abutment with the piston 102. There is provided at 126 a permanent communication between the tank 111 and an annular space 127 comprised between the shoulders 128 and 129 of the piston 100 which receives the joints 107 and 108 in order to maintain atmospheric pressure inside the space 127.

A chamber 110 is formed between the pistons 100 and 102, and is adapted to communicate with tank 111, at atmospheric pressure on the one hand through a small orifice 112, and on the other through a valve device 113, 114. The tank 111 is incorporated in the cylinder 34.

The small orifice 112 is uncovered at a position adjacent to the joint 107 when the piston 100 occupies its position of rest in abutment at 105. It is re-covered as soon as the piston 100 is allowed to move into the bore 101.

The valve device 113, 114 comprises a first valve 113 provided with a spring 115 and adapted to be applied against a fixed seating 16 and to be moved away from this seating so as to permit a circulation of fluid from the chamber 110 towards the tank 111 when the pressure in the chamber 110 exceeds the atmospheric pressure of the tank 111 by an amount capable of overcoming the calibration pressure of the spring 115. The valve device 113, 114 also comprises a second valve, such as a ball provided with a spring 117 and adapted to be applied under a seating formed by the first valve 113 and to be moved away from this seating so as to permit a circulation of fluid from the reservoir 111 towards the chamber 110 when the pressure in this chamber is reduced by a sufficient amount to overcome the calibration of the spring 117.

It will be noted that the valve assembly 113, 114, is added on and contained inside a cage 122 which is screwed at 123 into the wall of the cylinder 34. The section of passage of the oil between the valve 113 and the seating 116 is chosen large in order to avoid substantial hysteresis effects at the pedal 14.

The piston 102 comprises a sealing joint 118 co-operating with the bore 103, and is returned by a spring 119 into the position applied against a stop 120, so that in this position, the piston 102 is separated by a pre-determined distance from the buffer 109 when the piston 100 is in abutment at 105.

The joints 108 and 118 are in the shape of a cross while the joint 107 is of the type with lips.

The piston 102 is hollow so as to provide a communication between the chamber 110 and a chamber 121 formed at the head of the bore 103 when the piston 102 is moved away from the buffer 109. The chamber 121 is connected to the conduit 31 which supplies the receiver 29 (see FIGS. 1 and 2).

The final adjustment of the travel allocated to the clearance is obtained by the relative position of the two pistons 100 and 102, which is obtained by a washer 130, associated with the stop 120 and serving as a spacing piece. The adjustment of the dead travel of the pedal 14 is obtained by a washer 131, associated with the stop 105.

When the chamber 110 draws oil from the tank 111, the oil pushes the ball 114 downwards and can then pass from the tank 111 to the chamber 110. When the chamber 110 is under pressure, if this pressure is less than the value which corresponds to the calibration of the spring 115, the valve 113 is held closed by this spring and the oil cannot pass out of the chamber 110 to reach the tank 111. If this pressure is greater than the value which corresponds to the calibration of the spring 115, the valve 113 lifts and the oil is able to pass from the chamber 110 to the tank 111.

The calibration of the spring 115 is chosen greater than the value which corresponds to the effort necessary to bring up the stop 22 into contact with the ring 20, and less than the value which corresponds to the effort necessary to move the ring 20 against the action of the springs 13.

In the position of rest (FIG. 9) the pistons 100 and 102 are respectively pushed back into abutment at 105 and 120 by the springs 104 and 121, and the chamber 110 communicates directly with the tank 111 through the orifice 112. No pressure is applied to the conduit 31. The stop 22 is held separated from the ring 20 by the distance or clearance G.

In the new condition of the various parts of the clutch, this clearance G is chosen sufficiently large so that it is not reduced to zero after complete wear. For example, in order to give a definite idea, the clearance G may be 8 mm. when the parts are new and may fall to 2 mm. when the parts are completely worn.

When the pedal 14 is depressed, the piston 100 passes almost immediately over the passage 112. The oil from the chamber 110 expelled by the piston 100 encounters less resistance in moving the piston 28 so as to bring the stop 22 into contact with the ring 20 against the action of the spring 30 than in lifting the valve 113 against the action of the spring 115. The stop 22 is thus brought into contact with ring 20.

The piston 100 then occupies a position which depends on the state of wear but which in any case is such that it does not quite reach contact with the piston 102.

From that moment, the oil from the chamber 110 continuing to be expelled by the piston 100 encounters less resistance in lifting the valve 113 against the action of the spring 115 than in moving the piston 28 in order to move the combination of the stop 22 and the ring 20 against the action of the springs 30 and 13.

The oil expelled by the piston 100 thus returns to the tank 111 through the valve 113, and the assembly 22–20 remains stationary in the waiting position.

When the piston 100 reaches the piston 102, this by-pass is put out of action and the oil continuing to be expelled by the pistons 100 and 102, moves the piston 28 and the assembly 22–20 against the action of the springs 30 and 13, thus effecting de-clutching. This movement is carried out with a higher step-down ratio, since the section of the piston 102 is smaller than the section of the piston 100. The operation is thus facilitated.

In the alternative form shown in FIG. 10, the arrangement is similar to that which has just been described with reference to FIG. 9, but the joint 107 is modified and is formed by an elastic disc 107a applied on the front of the piston 100 and having sealing lips 132. The buffer 109 is itself formed by a cup mounted on a disc 107a. The valve 113 provided with the spring 115 is in this case formed by a ball, while the valve 114 and the spring 117 are eliminated, the return of oil from the tank 111 to the chamber 110 being effected by passing through the orifice 126 and the passage 127 and by passing through the lips 132.

Figure 10:
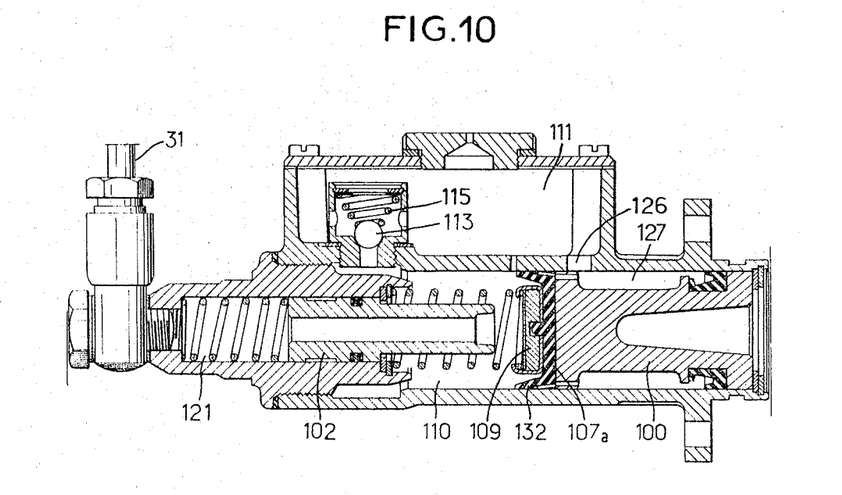

It should be noted that all or part of the arrangements shown in FIG. 9 may be combined with all or part of the arrangements shown in FIG. 10. For example, the master-cylinder of FIG. 9 could comprise the disc 107a of FIG. 10.

Figure 11:
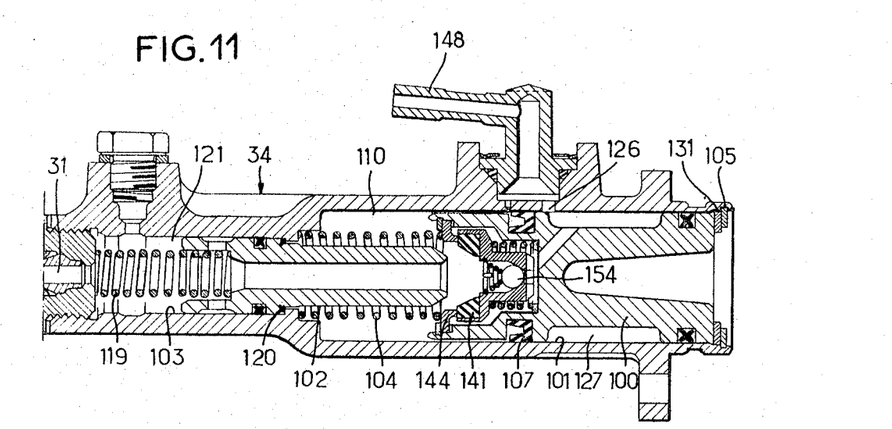
Figure 12:
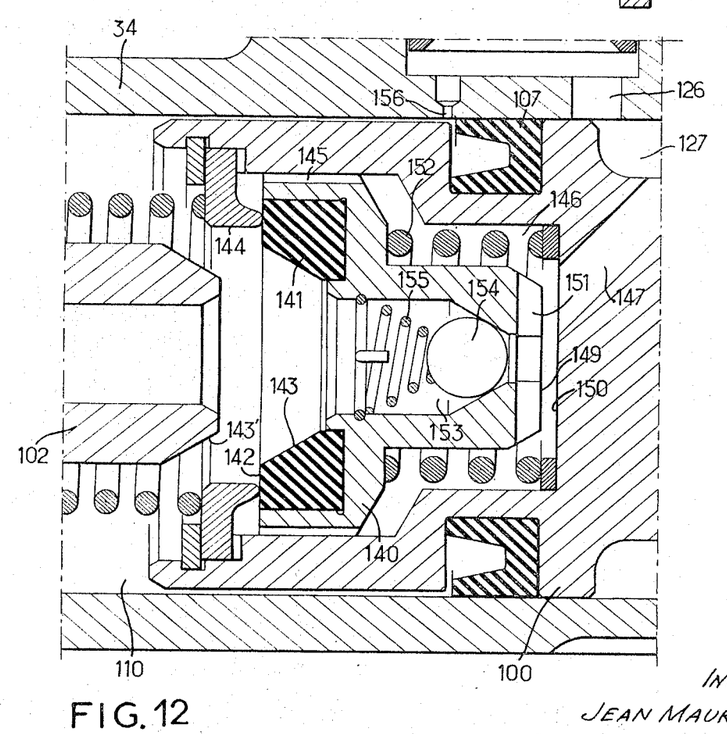
FIG. 12 is a view to a larger scale of a part of the master-cylinder of FIG. 11.

Reference will now be made to FIGS. 11 and 12, which relate to a further alternative form of master-cylinder transmitter 34. In FIG. 11, there is again seen, in particular at 100, the large piston sliding in the bore 101 and returned against the stop 131, 105 by the spring 104, at 102 the small hollow piston sliding in the bore 103 and returned against the stop 120 by the spring 119, at 121 the chamber adjacent to the piston 102 and connected to the conduit 31, and at 110 the central chamber comprised between the pistons 100 and 102.

In the piston 100 is mounted (FIG. 12) a sliding member 140 having a sealing joint 141 which co-operates on the one hand by a bearing surface 142 with a ring 144 fixed to the piston 100, and on the other hand by a bearing surface 143 with a conical extremity 143′ of the piston 102.

The member 140 is provided with fins 145 which are intended to guide the sliding action of the member 140 in the piston 100 and which leave between them communication passages to a chamber 146 formed in the piston 100. The chamber 146 communicates in turn with the tank (not shown) by a passage 147 connected to the space 127 in turn connected by the orifice 126 with a coupling 147 with the said tank. The chamber 110 further communicates with the coupling 148 by a small orifice 156 intended to be put out of action by the joint 107 from the beginning of the downward movement of the piston 100.

The member 140 is movably mounted in the piston 100 between on the one hand a position of abutment of the bearing surface 142 against the ring 144 and on the other hand a position of abutment of a bearing surface 149 of the member 140 against the bottom 150 of the chamber 146. The bearing surface 149 is formed by fins 151 which provides spaces enabling communication of the chamber 146 with the passage 147 to be maintained, even when the bearing surface 149 is in abutment against the bottom 150. A spring 152 supported on the bottom 150 tends to push the member 140 towards the left of FIG. 12, while holding the bearing surface 142 of the joint 141 in abutment against the ring 144.

The member 140 comprises an internal passage 153 provided with a one-way valve formed by a ball 154 associated with a spring 155. The ball 154 permits oil to circulate in the passage 153 from right to left, but prevents any circulation of fluid through this passage in the opposite direction.

The springs 13, 30 and 152 are chosen in such manner that the pressure in the chamber 121 necessary to overcome the de-clutching springs 13 is substantially greater than the pressure in the chamber 110 necessary to push the member 140 back against the action of the spring 152, and that this latter pressure is very slightly greater than the pressure necessary to overcome the fork spring 30.

In the engaged position, the bearing surface 142 of the joint 141 is in contact with the annular seating 144. From the beginning of the downward movement of the piston 100 for the purpose of de-clutching, the orifice 156 is put out of action by the joint 107.

When the piston 100 continues to move, the pressure rises in the chamber 110. When this pressure reaches the value at which the fork spring 30 is overcome, the ring 22 is brought into contact with the stop 20.

The pressure continuing to rise soon reaches the calibration of the spring 152, which opens the valve 142, 144. This point determined on the travel of the piston 100 is a function of the wear of the linings 18.

From this moment, the piston 100 moves until the joint 141 comes into contact by its bearing surface 143 with the corresponding bearing surface 143′ of the piston 102. The pressure in the chamber 110 remains equal to the pressure corresponding to the calibration of the spring 152. The chambers 121 and 110 are then isolated.

The de-clutching action proper then commences. In the chamber 121, the pressure reaches the calibration of the clutch springs 13 and de-clutching takes place. In the chamber 110, the pressure falls to zero since the piston 102 fully opens the valve 142, 144 and the fluid returns to the tank through the passages 146, 147, 127, 126 and 148. During the whole of this de-clutching operation, the ball 154 remains applied against its seating by the spring 155.

When the pedal 14 is released, the de-clutching springs 13 and the fork spring 30 bring back the piston systems 100 and 102 in the opposite direction. In the chamber 121, the pressure falls to the value corresponding to the calibration of the spring 154, while in the chamber 110 the pressure is zero since the valve 142, 144 is open. At that moment, the valve 142, 144 closes. The pistons 100 and 102 move apart. The ball 154 is applied against its seating by the pressure due to the fork spring 30.

After this travel, the ball 154 lifts and the liquid coming from the tank passes at 148, 126, 127, 147, 149, 153, by the effect of suction. The orifice 156 is then uncovered.

It will be understood that in the arrangement of FIGS. 11 and 12, the ball 154 is not liable to carry away a small quantity of oil from the cylinder towards the tank before it co-operates with its seating, and this quantity could not be renewed if the piston were not allowed to move sufficiently backwards.

It will also be noted that during the de-clutching action proper, the pressure in the chamber 110 is zero since the valve 142, 144 is open, which enables the action on the pedal 14 to be made smoother.

It will further be observed that the emitter 34 is of particularly simple and compact construction.

Figure 13:
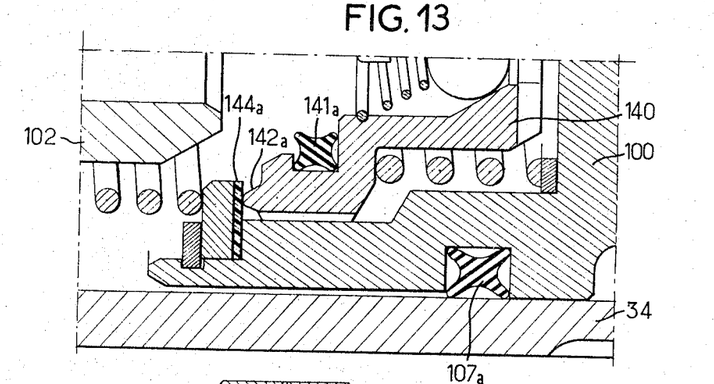
FIG. 13 is a lower half-view of this part, in which details have been modified.

In the alternative form shown in FIG. 13, the joints 107 and 141 are replaced by cruciform joints 107a and 141a. The seating 142, 144 is modified and comprises a rim 142a on the member 140 co-operating with an elastic lining 144a which forms a seating.

Figure 14:
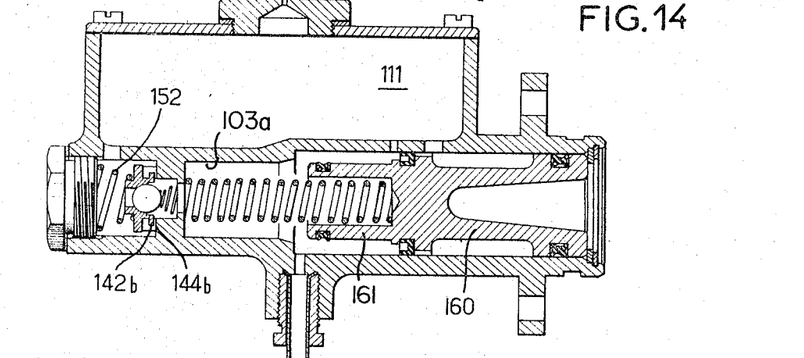
FIGS. 14 and 15 relate respectively to two further alternative forms of the master-cylinder.
Figure 15:
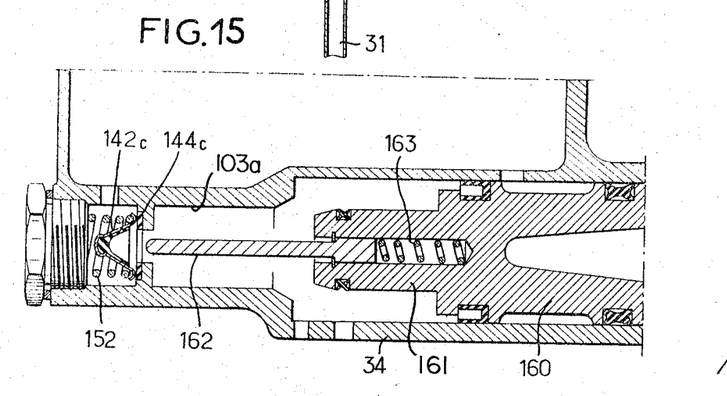

In the alternative forms shown in FIGS. 14 and 15, the master-cylinder 34 comprises, instead of two pistons 100 and 102 permitted to come into abutment against each other, a single piston 160 provided with a tail 161 which is allowed to penetrate into the smaller bore, with the reference number 103a. The valve designated by 142b, 144b in FIG. 14, and by 142c, 144c in FIG. 15, occupies a fixed position on the cylinder. The valve 142b, 144b of FIG. 14 receives an incorporated ball, similar to the ball 154 of FIG. 12. The valve 142c, 144c of FIG. 15 is actuated by a rod 162 connected to the piston 160 by a spring 163.

Figure 16:
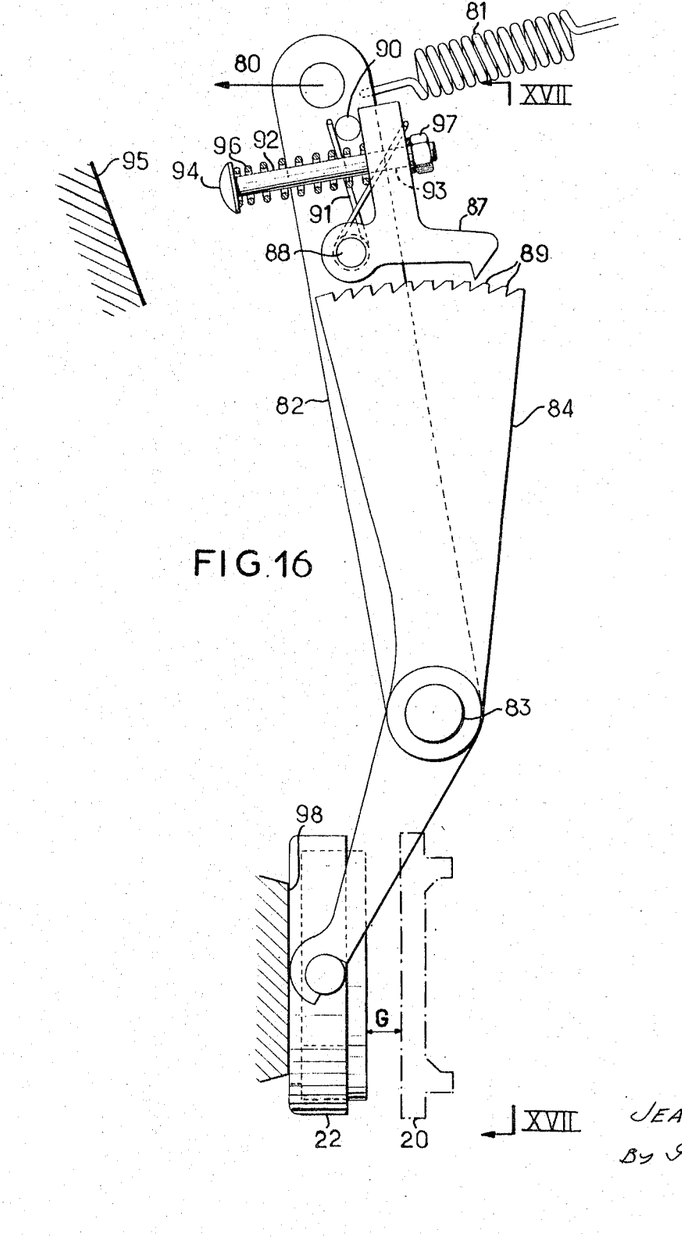
FIG. 16 concerns another alternative form of the declutching control.
Figure 17:
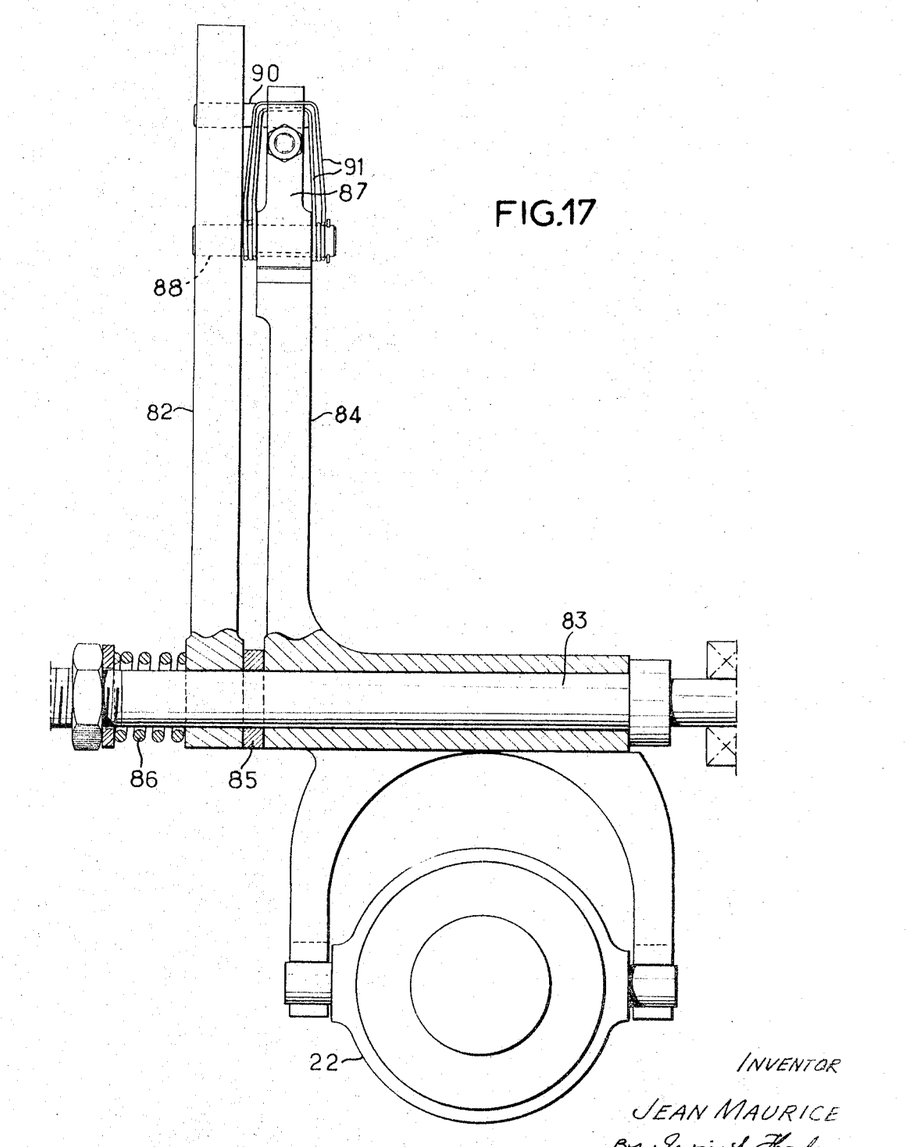
FIG. 17 is a corresponding view taken along the line XVII—XVII of FIG. 16.

Reference will now be made to FIGS. 16 and 17, in which the pedal 14 actuates, through the intermediary of a cam similar to the cam 38, a rod system shown diagrammatically at 80 in FIG. 16, which acts in opposition to a spring 81 on a first lever 82 pivoted about a fixed shaft 83. A second lever 84 is also pivoted about the shaft 83 and is clamped axially against the first lever 82 by a friction washer 85 subjected to the action of a spring 86 (see FIG. 17). It is the lever 84 which carries the stop 22.

A pawl 87 is pivotally mounted at 88 on the lever 82, and co-operates with a set of teeth 89 on the lever 84. The pawl 87 tends to be kept free of the teeth 89 by being applied against a stop 90 rigidly fixed on the lever 82, by a spring 91 wound round the shaft 88 and acting between the stop 90 and the pawl 87.

A finger 92 is slidably mounted at 93 in the pawl 87 and is provided with a rounded head 94 which is intended to co-operate in support against a fixed stop 95. A helicoidal spring 96, stronger than the spring 91, is engaged round the finger 92 between the head 94 and the pawl 87, and tends to maintain the finger 92 in the position of maximum projection at which a nut 97 screwed on the extremity of the finger opposite to the head 94 comes into abutment against the pawl 87.

In the position of rest, the stop 22 is maintained by the spring 81 in application against a fixed support 98, at which it is spaced apart from the ring 20 by the clearance G. When the pedal 14 is depressed, the rod system 80 moves the lever 82, which drives by friction at 85 the lever 84 carrying the stop 22 until the latter comes into contact with the ring 20. The resistance then encountered in continuing the movement of the lever 84 is greater than the driving capability of the friction 85 and the lever 84 remains stationary, while the lever 82 continues its movement alone.

When the head 94 comes into contact with the support 95, that is to say at a pre-determined position of the travel, the finger 92 is withdrawn into the pawl 87 and the spring 96 causes the pawl 87 to engage in the teeth 89. From this time on, the lever 84 is positively driven at the same time as the lever 82, and the assembly 22–20 effects the de-clutching.

The invention is of course not limited to the forms of construction described and shown, but includes all their alternative forms.

What I claim is:

1. In a clutch having a declutching mechanism operable by a declutching stop coupled through coupling means with a declutching pedal movable along a path, said stop being sufficiently large before clutch wear so as not to said pedal is at rest, said clearance being variable with the clutch wear, said stop being adapted to approach and thereafter operate said mechanism when said pedal is actuated for declutching purposes; the improvement comprising a control device for avoiding any adjustment of the said clearance during the clutch life, said clearance being sufficiently large before clutch wear so as not to be nullified after complete wear, said device comprising a limiting means in said coupling means for limiting force transmitted from said pedal through said coupling means to said stop, said force limiting means being calibrated to a value higher than that necessary for bringing said stop into contact with said mechanism and less than that necessary for operating said mechanism, and overriding means for transmitting from said pedal through said coupling means to said stop force capable of operating said mechanism, said overriding means being responsive to a predetermined position of the pedal between the ends of said pedal path and cooperating with said limiting means so as to leave said limiting means operative as long as said pedal has not reached said pre-determined position and to render inoperative said limiting means when said pedal reaches said predetermined position, whereby the said mechanism is operated as soon as said pedal has passed beyond the said predetermined position regardless of the amount of clutch wear.

2. A device as claimed in claim 1, in which said coupling means between the clutch pedal and the declutching stop comprise variable step-down ratio means adapted to provide a greater step-down ratio at the end than at the beginning of the travel of said clutch pedal.

3. A device as claimed in claim 2, in which said variable step-down ratio means comprise two ranges of said step-down ratio, of which the second is substantially greater than the first, said ranges being separated from each other by a point of transitor which coincides with the pre-determined position at which said force-limiting means are rendered inoperative.

4. A device as claimed in claim 1, in which said coupling means comprise an emitter master-cylinder, the piston of which is operated by the de-clutching pedal and expels a hydraulic fluid into a chamber which is coupled by a conduit to receiving jack, the piston of which actuates said de-clutching stop, said chamber being provided with a by-pass orifice in which the flow of fluid is subjected to a pre-determined resistance.

5. A device as claimed in claim 4, in which said resistance to flow is produced by a valve with a calibrated spring, said valve causing said chamber to communicate with a tank as soon as it is opened.

6. A device as claimed in claim 4, in which said resistance-producing means are incorporated in said piston.

7. A device as claimed in claim 2, in which said variable step-down ratio means comprise a cam between said pedal and the piston of said emitter master-cylinder.

8. A device as claimed in claim 1, in which said coupling means comprise an emitter master-cylinder provided with two piston elements, one of which is mounted in a chamber connected to a receiving jack operating the de-clutching stop, while the other said elements, of larger diameter than the first, is mounted in an intermediate chamber from which the outlet of fluid is subjected to a pre-determined resistance, a communication between the two chambers being closed at and beyond a pre-determined position of said pedal on said path.

9. A device as claimed in claim 8, in which said two piston elements are separate from each other, the second element being actuated by the pedal and adapted to come into abutment on the first said element, thereby closing a passage in said first element forming the communication between the two chambers.

10. A device as claimed in claim 1, in which said coupling means comprise an emitter master-cylinder having two pistons, one of which is actuated by the pedal and comes into abutment against the second said pistons which is hollow, by the intermediary of a buffer of flexible elastic material ensuring, at the moment of abutment of the two pistons, the fluid-tight closure of the hollow space of said second piston.

11. A device as claimed in claim 10, in which said buffer is associated with a fluid-tight joint of said first piston in a bore of said piston.

12. A device as claimed in claim 10, in which an intermediate chamber comprised between said two pistons is connected to a tank by a calibrated valve lifting under the effect of the pressure in said chamber.

13. A device as claimed in claim 12, in which said valve is removably mounted on said cylinder.

14. A device as claimed in claim 12, in which said valve is associated with a further valve adapted to act in the opposite direction.

15. A device as claimed in claim 12, in which said valve is mounted on the first piston, the abutment between the two pistons being effected by annular means concentric with said valve.

16. A device as claimed in claim 1, in which said coupling means comprise an emitter master-cylinder having a piston sliding in a first bore and having a tail adapted to be introduced, after a pre-determined travel, into a second bore of smaller diameter than the first bore.

17. A device as claimed in claim 16, in which a valve for coupling to the tank is provided in the cylinder at the end of the second bore.

18. A device as claimed in claim 1, in which said coupling means comprise two levers frictionally engaged one with the other and coupled to each other by a pawl and ratchet mechanism starting from a pre-determined position of said pedal on said path.

References Cited by the Examiner

UNITED STATES PATENTS

| | | | |
|---|---|---|---|
| 2,229,055 | 1/1941 | Dick | 192—91 X |
| 2,421,869 | 6/1947 | Brock | 192—111 |
| 2,525,220 | 10/1950 | Hague | 192—91 |
| 2,909,036 | 10/1959 | Dubonnet. | |

DAVID J. WILLIAMOWSKY, Primary Examiner.

BENJAMIN W. WYCHE, III, Assistant Examiner.